(12) United States Patent
Ruiter et al.

(10) Patent No.: US 11,080,495 B2
(45) Date of Patent: Aug. 3, 2021

(54) ANIMAL MOTION AND TEMPERATURE MONITORING

(71) Applicant: Unified Information Devices, LLC, Wilmington, DE (US)

(72) Inventors: Matthew Ruiter, Deerfiled, IL (US); Craig Jordan, Fox Lake, IL (US)

(73) Assignee: Unified Information Devices, LLC, Wilmington, DE (US)

( * ) Notice: Subject to any disclaimer, the term of this patent is extended or adjusted under 35 U.S.C. 154(b) by 0 days.

(21) Appl. No.: 16/664,488

(22) Filed: Oct. 25, 2019

(65) Prior Publication Data

US 2020/0134272 A1    Apr. 30, 2020

Related U.S. Application Data

(60) Provisional application No. 62/750,367, filed on Oct. 25, 2018.

(51) Int. Cl.

| | |
|---|---|
| *G06F 17/00* | (2019.01) |
| *G06K 7/10* | (2006.01) |
| *H01Q 1/22* | (2006.01) |
| *H01Q 21/28* | (2006.01) |
| *A01K 11/00* | (2006.01) |
| *A01K 29/00* | (2006.01) |
| *A01K 1/03* | (2006.01) |
| *G01K 13/20* | (2021.01) |

(52) U.S. Cl.
CPC .......... *G06K 7/10297* (2013.01); *A01K 1/031* (2013.01); *A01K 11/007* (2013.01); *A01K 29/005* (2013.01); *G01K 13/20* (2021.01); *H01Q 1/2216* (2013.01); *H01Q 21/28* (2013.01)

(58) Field of Classification Search
CPC .... A01K 11/007; A01K 1/031; A01K 29/005; G01K 13/002; G06K 7/10297; H01Q 1/2216; H01Q 21/28
See application file for complete search history.

(56) References Cited

U.S. PATENT DOCUMENTS

| | | | |
|---|---|---|---|
| 2002/0010390 A1* | 1/2002 | Guice | A61D 17/002 600/300 |
| 2015/0318624 A1* | 11/2015 | Schantz | G01S 5/14 343/867 |
| 2016/0260161 A1* | 9/2016 | Atchley | B62B 5/0069 |
| 2016/0349352 A1* | 12/2016 | Karani | G01S 5/0294 |

(Continued)

*Primary Examiner* — Thien M Le
(74) *Attorney, Agent, or Firm* — Locke Lord LLP; Christopher J. Capelli

(57) ABSTRACT

A computer system and method for identifying and monitoring animals in a confined space. A tracking apparatus is provided having a plurality of antenna arrays in proximity to a confined space. One or more animals to be disposed in the confined space are associated with a detection component operable to identify and detect a core body temperature of an animal it is associated with when detected by the tracking apparatus. Data is received in a computer monitor system from a detection component when detected by the tracking apparatus in the confined space. The received data identifies an animal in correlation with its motion and temperature data. Real-time position and core body temperature of a detected animal is determined while the animal is disposed in the confined space by analysis of the received data in the computer monitor system.

20 Claims, 5 Drawing Sheets

(56) References Cited

U.S. PATENT DOCUMENTS

| | | | |
|---|---|---|---|
| 2017/0013802 A1* | 1/2017 | Zimmerman | G06K 7/10009 |
| 2017/0049074 A1* | 2/2017 | Wilkinson | A01K 11/006 |
| 2017/0055496 A1* | 3/2017 | McHugh | A01K 11/008 |
| 2017/0332602 A1* | 11/2017 | Fen Rich | A01K 15/02 |
| 2018/0035256 A1* | 2/2018 | Prevatt | G01S 5/14 |

* cited by examiner

ANIMAL MOTION AND TEMPERATURE MONITORING

CROSS REFERENCE TO RELATED APPLICATIONS

This application claims priority to U.S. Patent Application Ser. No. 62/750,367 filed Oct. 25, 2018 which is incorporated herein by reference in its entirety.

FIELD OF THE INVENTION

The present invention relates to a method and apparatus for detecting the motion and temperature of animal, and more particularly to detecting certain animal characteristics from an animal confinement structure.

BACKGROUND OF THE INVENTION

In animal motion activity measurement, the engineering techniques are usually adopted to measure the changes of animal motion activity in a limited space, but most of the developed automatic methods for animal activity measurement could not get the whole data of the animal motion activity patterns and tracks of movement at a time.

To record the animal's moving path is of considerable importance and is very useful for many applications in behavior and neurophysiological studies. From the moving path, many useful variables of motor behavior could be analyzed such as total distance traveled, average speed, rest time, turning, and pattern of movement. A number of automatic measuring systems have been developed and reported and also available commercially. Various detection methods were offered. These include the use of video camera and photocell methods. The video camera system, however, has some drawbacks; for example, measurement needs proper illumination and sharp contrast between animal and background is required, as well as prolonged human monitoring of video recordings.

It is also to be appreciated that current systems do not allow for the addition of recording core animal body temperatures combined with animal location monitoring tracking. This is principally because the size needed for a tracking device for recording both animal body core temperature and location together in one device was not achievable due to the miniature size required for such a tracking device while still providing high quality of an emitted tracking signal and speed of reading devices receiving the information.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, an animal (rodent) is described in which a miniaturized sensor (i.e., a capsule) is configured to be implanted under the skin layer of an animal operable to record core body temperatures and animal movement, preferably via RFID. In an illustrated embodiment, a multiplexed RFID reader is coupled to an antenna array for preferably detecting and monitoring a small implantable Low Frequency (LF) programmable microchip provided in an implantable capsule device. A computer tracking system is preferably coupled to the multiplexed RFID reader and is configured and operable to perform animal identification and core body temperature determination/recordation.

In another aspect, a computer system and method are described for identifying and monitoring animals in a confined space in which a tracking apparatus is provided having a plurality of antenna arrays in proximity to a confined space. One or more animals to be disposed in the confined space are associated with a detection component operable to identify and detect a core body temperature of an animal it is associated with when detected by the tracking apparatus. Data is received in a computer monitor system from a detection component when detected by the tracking apparatus in the confined space. The received data identifies an animal in correlation with its motion and temperature data. Real-time position and core body temperature of a detected animal is determined while the animal is disposed in the confined space by analysis of the received data in the computer monitor system. In further aspects, a UI may be generated on a display associated with the computer monitor indicating the position of each detected animal in the cage in association with its individual identifying information. Additionally, the computer monitor system may generate motion and temperature profile data in the computer monitor system for each identified animal in the cage for a prescribed period of time.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
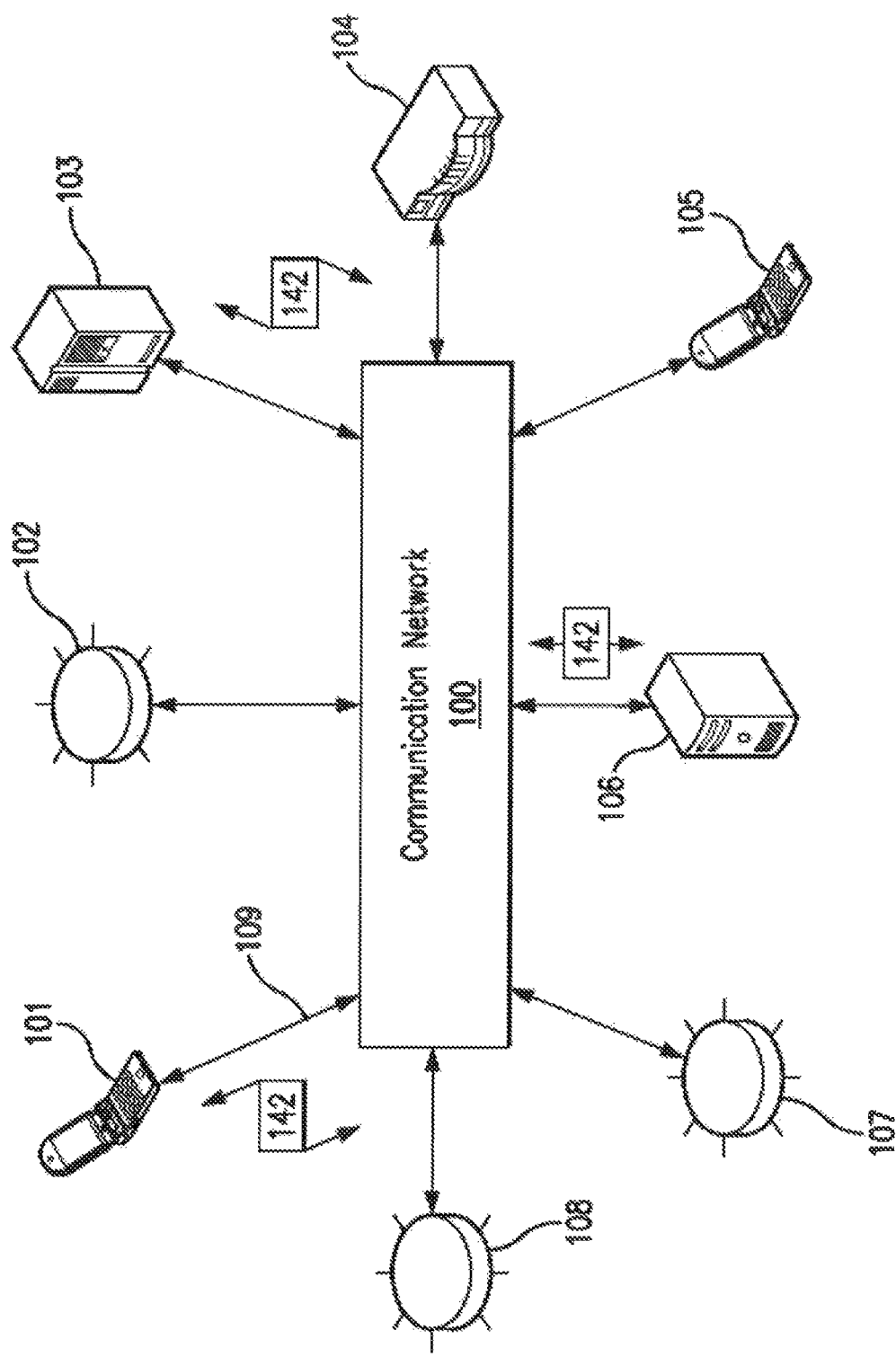
FIG. 1 depicts an example communication network used with an illustrated embodiment.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either both of those included limits are also included in the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety.

Turning now descriptively to the drawings, in which similar reference characters denote similar elements throughout the several views, FIG. 1 depicts an exemplary computer network 100 in which below illustrated embodiments may be implemented.

It is to be understood a computer network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example computer network 100 illustratively comprising nodes/devices 101-108 (e.g., sensors 102, client computing devices 103, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Computer program instructions may be provided to a processor of a computer apparatus (e.g., an animal computer tracking system), or other programmable data processing apparatus to produce a machine, such that the instructions, which execute via the processor of the computer or other programmable data processing apparatus, create means for implementing the functions/acts specified in the flowchart and/or block diagram block or blocks.

It is to be appreciated that the computer network 100 may be an integrated component of the data management system illustrated and described in commonly assigned pending U.S. patent application Ser. No. 14/929,823, the contents of which are incorporated by reference herein in its entirety.

Figure 2:
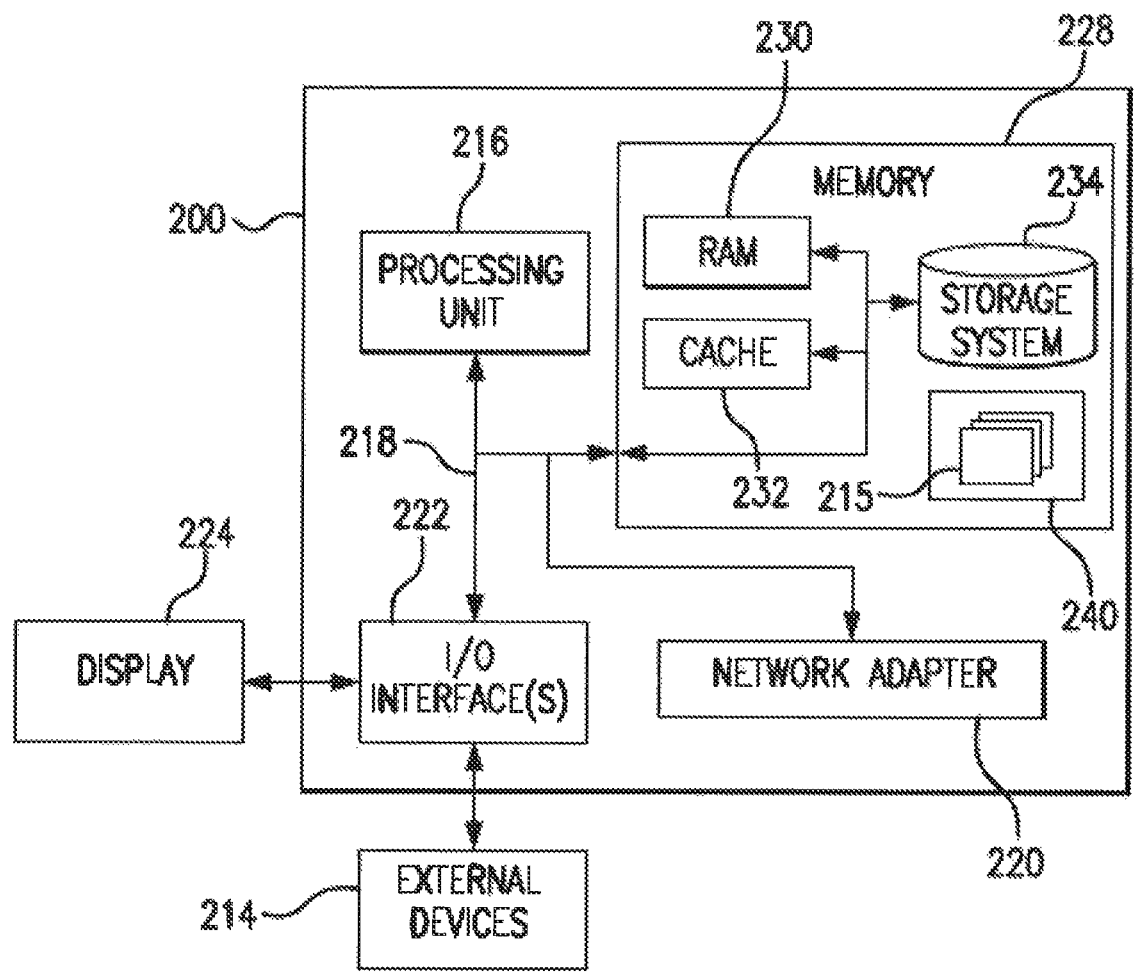
FIG. 2 depicts an example network device/node used with an illustrated embodiment.

FIG. 2 is a schematic block diagram of an example network computing device 200 (e.g., client computing device 103, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a special purpose computing device, components of which are to be understood to be included the in below described animal tracking system 450 in accordance with the illustrated embodiments. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Figure 3:
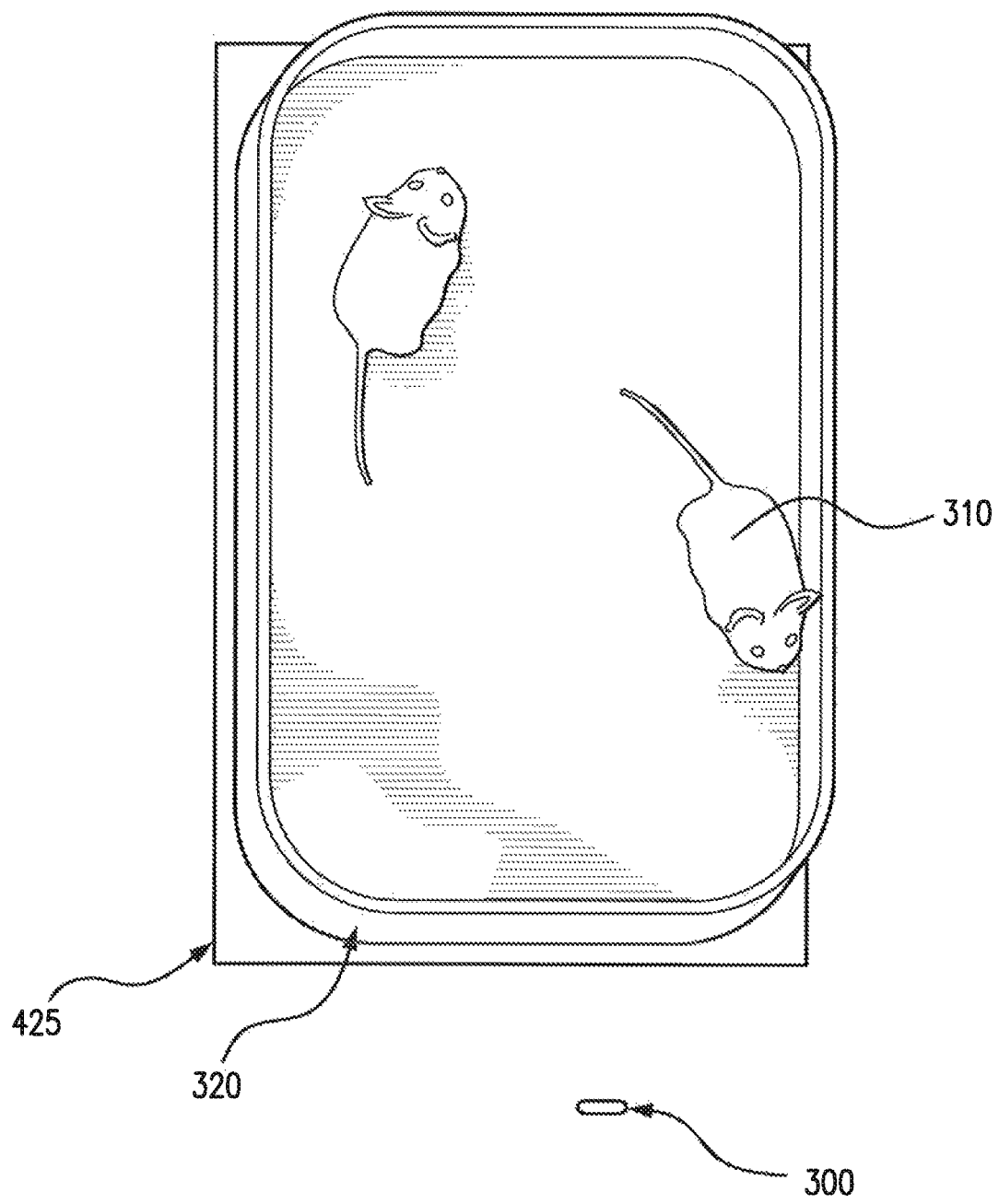
FIG. 3 depicts an animal containment structure integrated with a tracking apparatus of an illustrated embodiment.
Figure 4:
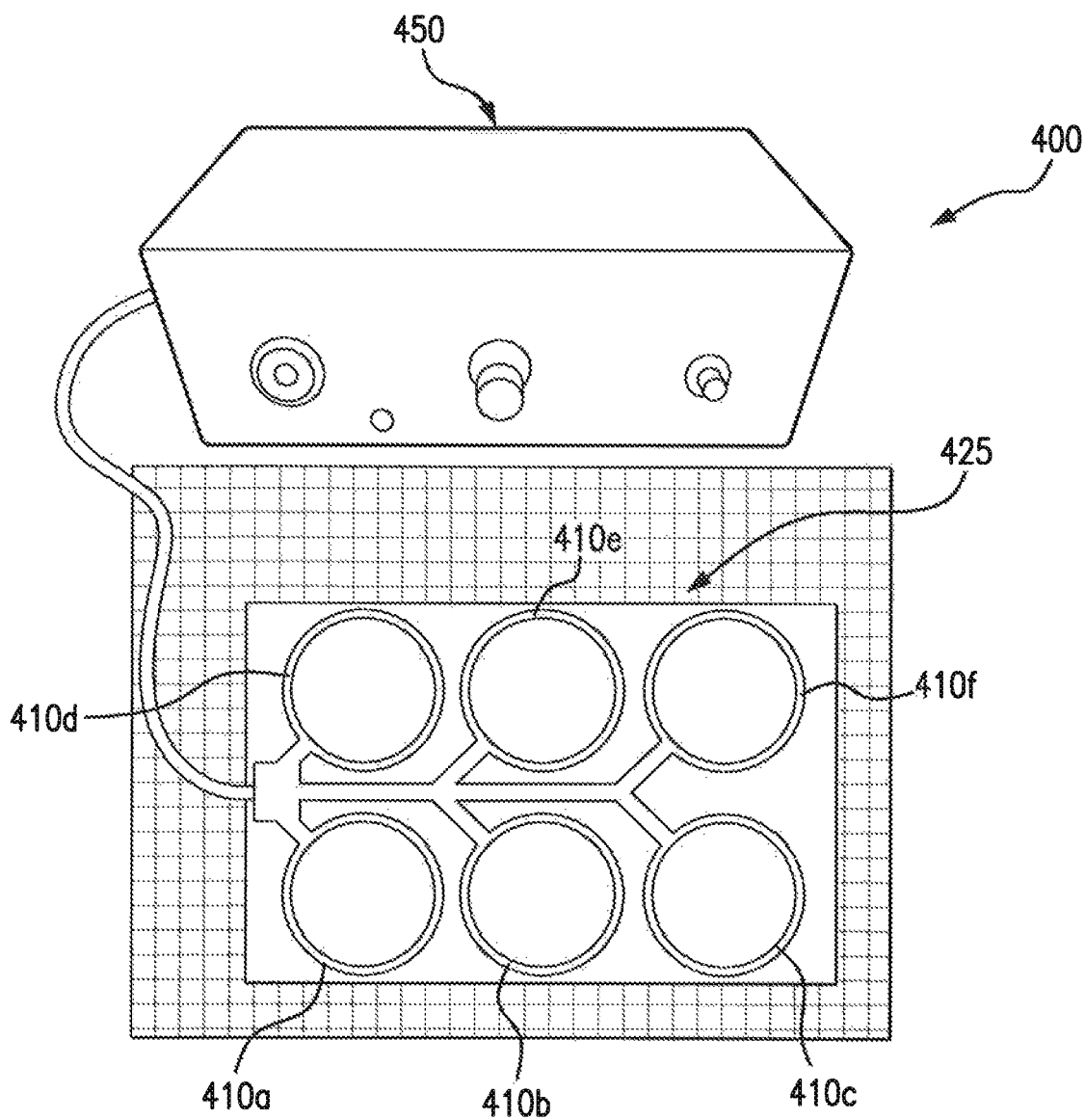
FIG. 4 depicts an animal tracking apparatus of an illustrated embodiment used in conjunction with the animal containment structure of FIG. 3 and coupled to an animal tracking computer system.
Figure 5:
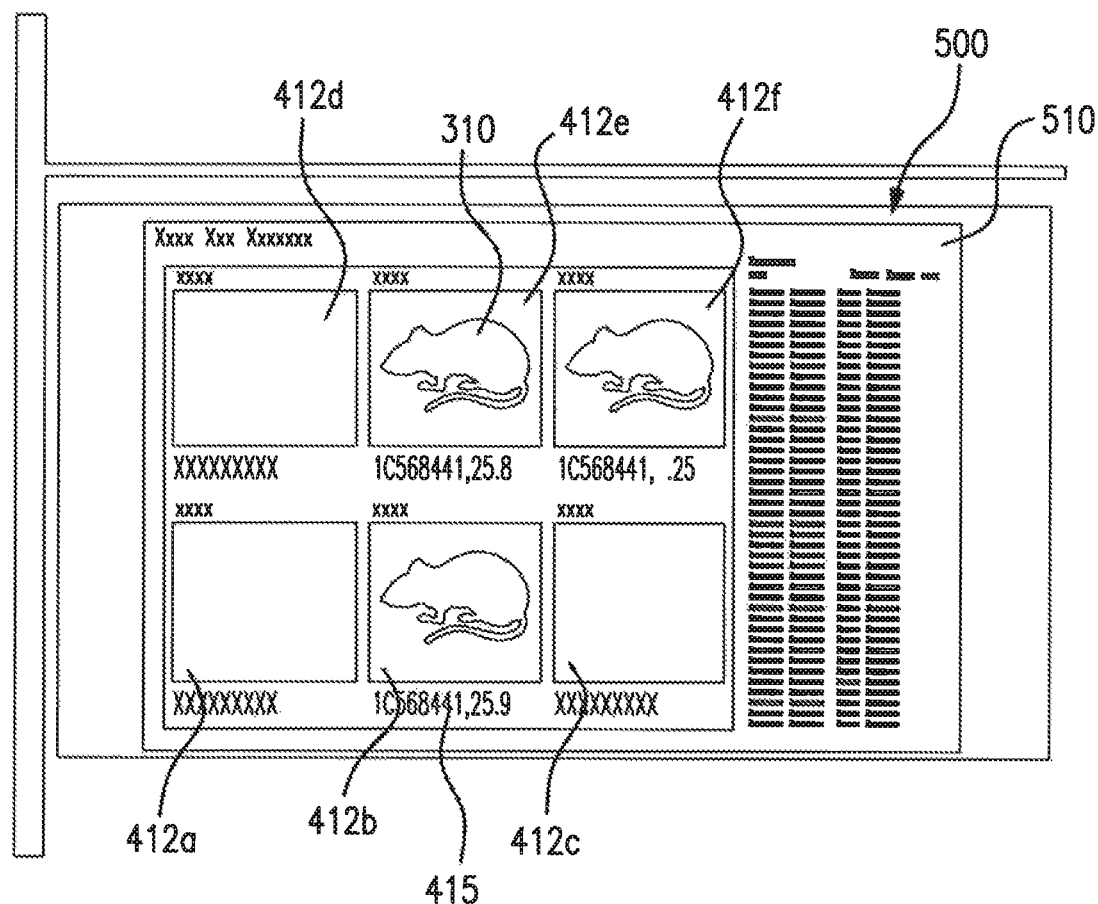
FIG. 5 depicts a GUI associated with the animal tracking computer system of FIG. 4 illustrating animal tracking.

Program/utility 240, having a set (at least one) of program modules 215, for carrying out the functionality of the illustrated embodiments of FIGS. 3-5, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With the exemplary communication network 100 (FIG. 1) and computing device 200 (FIG. 2) being generally shown and discussed above, description of certain illustrated embodiments of the present invention will now be provided. With reference now to certain embodiments of the present invention illustrated in FIGS. 3-5, it is to be appreciated that in accordance with the illustrated embodiments described herein for detecting and tracking motion of an animal, it is to be understood a tracking device 300 is to be associated with animals 310 (such as laboratory testing mice/rats). In accordance with the illustrated embodiments described herein, the tracking device 300 preferably consists of a capsule device configured to be inserted under the skin layer of an animal 310 (e.g., mice). Each capsule device 300 preferably includes a passive RFID identifier and thermometer device for recording and transmitting both an RFID identifier and a core body temperate of the associated animal 310. Preferably, the RFID identifier in each capsule 300 is software programmable so as to be programmed with an identifier (e.g., a serial number) that is uniquely associated with a particular animal 310. Thus, when a RFID scanning device is used to transmit/receive RFID signals, the capsule device 300 when subject to that RFID signal emits a signal containing the unique RFID identifier of the capsule 300 as well as the core body temperature of the animal 310 the capsule 300 is associated with.

It is to be appreciated the tracking device 300 is not to be understood to be limited to the above described capsule device 300 as it may be encompassed/constructed in various configurations and attached to any suitable portion of an animal it is intended to be associated with. For instance, an RFID tag may be used that is attached to an ear of a rodent, such as a rat. The tag may be attached to the ear using any suitable structure. In some advantageous embodiments, the tag does not need to have a power source and may be used as a wireless device. In one some embodiments, the tag may comprise passive elements such as an inductive element and a capacitive element. It is to be appreciated that any suitable electrical structures may be used for the inductive and capacitive elements which provide suitable inductive and capacitive behavior characteristics suitable for carrying out the functionality of the illustrated embodiments as described herein.

With particular reference to FIG. 4, shown is a tracking system 400 consisting of a tracking apparatus 425 (tracking pad) communicatively coupled to tracking computer system 450. It is to be understood the tracking apparatus 425 may be communicatively coupled to the tracking computer 450 through any known wired and wireless coupling methods for transmitting data there between. In accordance with the illustrated embodiment of FIG. 4, the tracking apparatus 425 preferably includes a plurality of scanning devices 410*a-f*, each individually configured and operable to track movement of an animal 310 located preferably in close proximity to a scanning device 410 of the tracking apparatus 425. It is to be understood for ease of illustration and description, tracking computer system 450 is shown coupled to a single tracking apparatus pad 425 in the illustrated embodiment of FIG. 4. It is to be understood and appreciated that the tracking system 450 is not to be understood to be limited to coupling to only a single tracking pad apparatus 425, rather it is to be understood and appreciated that the tracking system 450 is configured and operable to couple to a plurality of tracking pad apparatus' 425 in accordance with the description of the illustrated embodiments.

With reference now to FIGS. 3 and 4, the tracking apparatus 425 is preferably associated with an animal cage apparatus 320 for tracking movement of an animal 310 within the animal cage 320. As shown in the illustrated embodiment of FIG. 3, the tracking apparatus 425 is shown to be disposed below a bottom surface of the animal cage 320. However, it is to be appreciated that the tracking pad 425 may be disposed in various orientations relative to the animal cage 320 (e.g., above cage 320), and thus it not to be understood to be limited to being disposed below the animal cage 320.

As best illustrated in FIG. 3, the tracking pad 425 is shown disposed beneath an animal cage apparatus 320 configured to contain one or more animals 310. As shown in the illustrated embodiment of FIG. 4, the tracking pad 425 is configured in a planar pad structure dimensioned to preferably reside beneath the floor plane 325 of an animal cage 320. As further shown in the illustrated embodiment of FIG. 4, the tracking pad 425 includes a plurality of scanning apparatuses 410*a-f*. For illustrative purposes, six (6) scanning apparatuses 410*a-f* are shown included with the tracking pad 425, however it is to be understood the tracking pad is not to be understood to be limited to the six (6) scanning apparatuses 410*a-f* shown, as more or less may be provided in accordance with the description herein.

Each scanning apparatus 410*a-f* preferably consists of a powered (active) RFID scanning device having a coupled antenna array, each being coupled to the tracking computing system 450 for both receiving power energizing the each RFID scanning apparatus 410*a-f* and sending data communication therebetween. In accordance with the illustrated embodiment, each RFID scanning apparatus 410*a-f* may include a 134.2 kHz RFID reader coupled to a multiplexed main circuit board wherein the tracking pad 425 is configurable to implement 1-N number of antenna inputs 410. Each RFID scanning apparatus 410a-f is preferably configured and operable to detect location and temperature of an animal 310 (via RFID scanning of a tracking capsule device 300 associated with the animal (e.g., implanted within) 310). It is to be appreciated each scanning apparatus 410a-f is not to be understood to be limited to using an RFID antenna array for detecting presence and temperature of an animal, as any suitable wireless detection system may be implemented. It is to be further appreciated, that in accordance with an illustrated embodiment, the read speed for the tracking system 450 to acquire motion and temperature profile data from an animal is approximately 80 ms per read.

As shown in the exemplary embodiment of FIG. 4, the tracking system 400 is configured to have six (6) separate RFID antenna scanning devices 410a-f, each coupled to the tracking computer system 450. Hence, the floor portion 325 of the animal cage 320 is apportioned into six segments, each corresponding to an individual RFID antenna scanning devices 410a-f. In accordance with the illustrated embodiments, the tracking computer system 450, in conjunction with the tracking pad 425, is configured and operable to detect and track movement/motion of an animal 310 from one apportioned region of the animal cage 320 to another apportioned region, wherein each apportioned region of the animal cage 320 is preferably associated with an individual scanning device 410a-f. Additionally, the tracking system 400 is further configured to the capture the temperature of each animal 310 having an associated tracking device 300 in the animal cage 320, since in accordance with the illustrated embodiments, the each tracking device 300 is operative to detect the temperature of an associated animal. The detected animal temperature data is then transmitted to a scanning device 410a-f the animal is located in close proximity to. Each scanning device 410a-f is then operative to transmit the detected animal temperature to the tracking computer system 450 for subsequent analytics.

With reference now to FIG. 5, the operability and functionality of the animal tracking computer system 450 is now provided. As mentioned above, system 450 is operative and configured to communicate with an animal tracking pad 425 to electronically receive data indicative of an animal's 310 motion and temperature while disposed in an animal cage 320. Thus, the system 450 is operative to create motion and temperature profiles for animals 310 disposed in an animal cage 320.

For instance, as shown in a GUI 500 generated by system 450, system 450 detects/records/displays when an animal 310 traverses from one section 412a-f of an animal cage 320 to another section 412a-f via interaction with a RFID tracking capsule 300 disposed in an animal 310 via an RFID scanning antenna device 410a-f located in proximity with the current position of that animal 310 in the animal cage 320. As shown in FIG. 5, (e.g., as displayed in window portion 510 of GUI 500) the tracking computer system 450 detects not only the current position of a certain animal 310 in cage 320, but also the unique RFID identifier 415 associated with the animal's embedded tracking capsule 300, as well as the current core body temperature of that animal 310 via the RFID scanning of the capsule 300 embedded in the animal 310 by a respective scanning antenna device 410a-f. Thus, it is to be appreciated that the RFID implanted chip/capsule 300 and a quadrant-based antenna array 410a-f of the tracking apparatus reader 400 preferably sends to software programmable tracking computer system 450 a date and time stamp, reader antenna, microchip ID and the animal's temperature. Using software tools a user preferably maps movement of the animals and graphs animal temperatures.

It is to be appreciated that, in accordance with the illustrated embodiments, tracking system 450 is configured and operable to generate motion and temperature profiles for animals 310 located in an animal cage 320 over a prescribed period of time. For instance, the motion and temperature profile of an animal 310 may be viewed and analyzed for a 3 hr time period following the animal be subjected to a defined event (e.g., surgery, mediation, etc.). Additionally, threshold values may be prescribed for detected motion and temperature of one or more animals 310 such that when there is a prescribed deviation from a detected motion and/or temperature profile, a message (e.g., alert) may by generated and transmitted to one or more recipients indicating such deviation. The tracking system 450 may be further configured and operable, in accordance with the illustrated embodiments, to enable definition of subgroups of animals located in one or more animal cages 310, such that motion and temperature profiles are generated for each defined subgroup. For instance, one subgroup may consist of animals subject to medication A, while another subgroup may consist of animals subject to medication B. Hence, the tracking system 450 may be configured and operational to generate the average, mean and median values for the determined motion and temperature profiles of each defined animal subgroup so as to be utilized in subsequent laboratory analytics.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A system for identifying and monitoring a plurality of animals in a confined space, comprising:
    a computer monitoring system having a processor and memory;
    at least one tracking apparatus communicatively coupled to the computer monitoring system configured to be disposed in proximity to a confined space, each tracking apparatus including:
        a plurality of antenna arrays each configured to detect individual identification of an animal associated with a detection component in correlation the animal's motion and temperature data when the animal is located in close proximity to one of the plurality of antenna arrays in the confined space;
        a communicative coupling to the computer monitoring system such that the computer monitoring system receives the detected information identifying an animal in correlation with its motion and temperature data when the animal is located in close proximity to one of the plurality of antenna arrays in the confined space whereby the computer monitoring system detects a real-time position and core body temperature of a detected animal disposed in the confined space whereby the computer monitoring system generates for each identified animal a motion and temperature profile indicating the detected motion of the animal in the confined space, and correlates the motion and temperature profile with an apportioned region of the confined space so as to generate on a display associated with the computer monitoring system a UI illustrating a unique identifier of an animal in association with its generated motion and temperature profile as correlated with the apportioned region of the confined space.

2. The system as recited in claim 1, wherein the confined space is an animal cage and the at least one tracking apparatus is disposed beneath a floor portion of the animal cage.

3. The system as recited in claim 2, wherein each of the plurality of antenna arrays divides the floor portion of the animal cage into a corresponding individual apportioned region of the animal cage such that the monitoring system determines movement and temperature of each identified animal in correlation with an apportioned region of the animal cage.

4. The system as recited in claim 1, wherein each detection component includes an RFID detection element and temperature sensing device for determining a core body temperature of an animal the detection component is associated with.

5. The system as recited in claim 4, wherein each RFID detection element is configurable to be programmed with a unique identifier identifying the animal it is associated with.

6. The system as recited in claim 5, wherein the detection component consist of a capsule device configured to be located internal of an animal.

7. The system as recited in claim 4, wherein each antenna array of the at least one tracking apparatus emits an RFID signal configured to interact with each detection component to facilitate transmission of data from a detection component to the at least one tracking apparatus.

8. The system as recited in claim 1, wherein the computer monitoring system is further configured to generate motion and temperature profile data for each identified animal in the confined space for a prescribed period of time.

9. The system as recited in claim 1, wherein the computer monitoring system is further configured to define a plurality of subgroups from the plurality of animals wherein a motion and temperature profile is generated for each defined subgroup of animals and generated on the display of the UI is the motion and temperature profile for each defined subgroup of animals.

10. The system as recited in claim 1, wherein a plurality of tracking apparatus are provided each being communicatively coupled to the computer monitoring system.

11. A computer method for identifying and monitoring animals in a confined space, comprising the steps:
providing a tracking apparatus having a plurality of antenna arrays in proximity to a confined space;
associating one or more animals to be disposed in the confined space with a detection component operable to identify and detect a core body temperature of an animal it is associated with when detected by the tracking apparatus;
receiving data in a computer monitor system from a detection component when detected by the tracking apparatus in the confined space wherein the received data identifies an animal in correlation with its motion and temperature data when the animal is located in close proximity to one of the plurality of antenna arrays in the confined space;
determine real-time position and core body temperature of a detected animal disposed in the confined space by analysis of the received data in the computer monitor system; and
generate for each identified animal a motion and temperature profile indicating the detected motion of the animal in the confined space and correlate the motion and temperature profile with an apportioned region of the confined space so as to generate on a computer display a UI illustrating a unique identifier of an animal in association with its generated motion and temperature profile as correlated with the apportioned region of the confined space.

12. The method as recited in claim 11, wherein the confined space is an animal cage and the at least one tracking apparatus is disposed beneath a floor portion of the animal cage.

13. The method as recited in claim 12, wherein each of the plurality of antenna arrays divides the floor portion of the animal cage into a corresponding individual apportioned region of the animal cage such that the computer monitor system determines movement and temperature of each detected animal in correlation with an apportioned region of the animal cage.

14. The method as recited in claim 11, wherein each detection component includes an RFID detection element and temperature sensing device for determining a core body temperature of an animal the detection component is associated with.

15. The method as recited in claim 14, wherein each RFID detection element is configurable to be programmed with a unique identifier identifying the animal it is associated with.

16. The method as recited in claim 15, wherein the detection component consists of a capsule device configured to be located internal of an animal.

17. The method as recited in claim 14, further including emitting an RFID signal from each antenna array of the at least one tracking apparatus configured to interact with a detection component receiving the emitted RFID signal to facilitate transmission of data from the detection component to the at least one tracking apparatus.

18. The method as recited in claim 11, further including:
defining a plurality of subgroups from the plurality of animals wherein a motion and temperature profile is generated for each defined subgroup of animals; and
generating on the display of the UI the motion and temperature profile for each defined subgroup of animals.

19. A computer method for identifying and monitoring animals in a cage, comprising the steps:
providing a tracking apparatus having a plurality of antenna arrays in proximity to the cage;
associating one or more animals to be disposed in the confined space with a detection component inserted internal of an animal in a capsule, the detection component operable to identify and detect a core body temperature of an animal it is associated with when detected by the tracking apparatus wherein each detection component includes an RFID detection element and temperature sensing device for determining a core body temperature of an animal the detection component is associated with;

emitting an RFID signal from each antenna array of the at least one tracking apparatus configured to interact with a detection component receiving the emitted RFID signal to facilitate transmission of data from the detection component to the at least one tracking apparatus;

receiving data in a computer monitor system from a detection component when detected by the emitted RFID signal of the tracking apparatus wherein the received data identifies an animal in correlation with its motion and temperature data when the animal is located in close proximity to one of the plurality of antenna arrays in the cage;

determining real-time position and core body temperature of a detected animal disposed in the cage by analysis of the received data in the computer monitor system;

defining a plurality of subgroups from the plurality of the animals;

generating motion and temperature profile data in the computer monitor system for each defined subgroup of animals in the cage for a prescribed period of time including generating the average, mean and median values for the determined motion and temperature profiles of each defined animal subgroup so as to be utilized in subsequent laboratory analytics;

correlating the motion and temperature profile for each defined subgroup of animals with an apportioned region of the cage; and generating on the display of the UI the motion and temperature profile for each defined subgroup of animals indicating the detected motions and temperatures of the defined subgroup of animals in the cage as correlated with the apportioned region of the cage.

20. The method as recited in claim 19, further including:

disposing the at least one tracking apparatus is disposed beneath a floor portion of the animal cage whereby each of the plurality of antenna arrays divides the floor portion of the animal cage into a corresponding individual apportioned region of the animal cage such that the computer monitoring system determines movement and temperature of each detected animal in correlation with an apportioned region of the animal cage.

* * * * *